United States Patent
Sedarat et al.

(10) Patent No.: US 11,228,465 B1
(45) Date of Patent: *Jan. 18, 2022

(54) RAPID TRAINING METHOD FOR HIGH-SPEED ETHERNET

(71) Applicant: Aquantia Corporation, San Jose, CA (US)

(72) Inventors: Hossein Sedarat, San Jose, CA (US); Seid Alireza Razavi Majomard, San Carlos, CA (US); Dragan Labalo, San Jose, CA (US); Ramin Farjadrad, Los Altos, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 28 days.

This patent is subject to a terminal disclaimer.

(21) Appl. No.: 16/362,479

(22) Filed: Mar. 22, 2019

(51) Int. Cl.
*H04L 25/02* (2006.01)
*H04L 1/00* (2006.01)

(52) U.S. Cl.
CPC .......... *H04L 25/023* (2013.01); *H04L 1/0003* (2013.01); *H04L 1/0041* (2013.01); *H04L 1/0046* (2013.01); *H04L 1/0057* (2013.01)

(58) Field of Classification Search
CPC . H04L 27/04; H04L 5/00; H04L 27/26; H04L 29/06; H04L 41/0889; H04L 41/0809; H04L 41/0866; H04L 7/00; H04L 12/403; H04L 1/0045; H04L 25/03114; H04B 3/30; H04B 3/32; H04B 7/216; H04B 1/04; H04B 1/12; H04B 1/40; H04W 52/365

See application file for complete search history.

(56) References Cited

U.S. PATENT DOCUMENTS

| | | | |
|---|---|---|---|
| 3,506,906 A | 4/1970 | Nestor | |
| 3,671,859 A | 6/1972 | Miller | |
| 5,680,400 A | 10/1997 | York | |
| 5,832,032 A | 11/1998 | Overbury | |
| 5,995,566 A | 11/1999 | Rickard et al. | |
| 5,995,567 A | 11/1999 | Cioffi et al. | |
| 6,052,385 A | 4/2000 | Kanerva | |
| 6,052,420 A | 4/2000 | Yeap | |
| 6,081,523 A | 6/2000 | Merchant et al. | |
| 6,094,461 A * | 7/2000 | Heron | H04L 1/0045 370/292 |
| 6,121,890 A | 8/2000 | Rao | |
| 6,137,829 A | 10/2000 | Betts | |

(Continued)

FOREIGN PATENT DOCUMENTS

WO WO2000/021204 4/2000

OTHER PUBLICATIONS

U.S. Appl. No. 12/977,844, filed Dec. 23, 2010, Sedarat.

(Continued)

*Primary Examiner* — Hanh N Nguyen

(57) ABSTRACT

A method of operation for an Ethernet transceiver is disclosed. The method includes entering a training sequence. The training sequence includes transferring uncoded two-level symbols to a link partner; exchanging updated precoder coefficients with the link partner; and directly following exchanging updated precoder coefficients, transferring multi-level symbols to the link partner. The multi-level symbols being encoded consistent with the exchanged updated precoder coefficients and having greater than two symbol levels.

20 Claims, 3 Drawing Sheets

(56) References Cited

U.S. PATENT DOCUMENTS

| | | | |
|---|---|---|---|
| 6,195,360 B1 | 2/2001 | Raza et al. | |
| 6,345,071 B1 | 2/2002 | Hamdi | |
| 6,377,640 B2 | 4/2002 | Trans | |
| 6,385,315 B1 | 5/2002 | Viadella et al. | |
| 6,467,092 B1 | 10/2002 | Geile et al. | |
| 6,532,277 B2 | 3/2003 | Ulanskas et al. | |
| 6,690,739 B1 | 2/2004 | Mui | |
| 6,711,207 B1 | 3/2004 | Amrany et al. | |
| 6,734,659 B1 | 5/2004 | Fortner | |
| 6,922,448 B1 | 7/2005 | Jacobsen et al. | |
| 6,924,724 B2 | 8/2005 | Grilo et al. | |
| 6,959,056 B2 | 10/2005 | Yeap et al. | |
| 7,026,730 B1 | 4/2006 | Marshall et al. | |
| 7,027,407 B2 | 4/2006 | Diepstraten et al. | |
| 7,106,833 B2 | 9/2006 | Kerpez | |
| 7,113,491 B2 | 9/2006 | Graziano et al. | |
| 7,123,117 B2 | 10/2006 | Chen et al. | |
| 7,158,563 B2 | 1/2007 | Ginis et al. | |
| 7,200,180 B2 | 4/2007 | Verbin et al. | |
| 7,782,852 B2 | 4/2007 | Tellado et al. | |
| 7,315,592 B2 | 1/2008 | Tsatsanis et al. | |
| 7,324,511 B2 | 1/2008 | Nishihara | |
| RE40,149 E | 3/2008 | Vitenberg | |
| 7,353,007 B2 | 4/2008 | Carballo et al. | |
| 7,492,840 B2 | 2/2009 | Chan | |
| 7,525,992 B1 | 4/2009 | Shachal | |
| 7,567,620 B2 | 7/2009 | Rozental | |
| 7,593,431 B1 | 9/2009 | Lo et al. | |
| 7,646,699 B2 | 1/2010 | Tellado et al. | |
| 7,656,956 B2 | 2/2010 | King | |
| 7,664,254 B2 | 2/2010 | Bostoen et al. | |
| 7,693,240 B2 | 4/2010 | Mezer | |
| 7,697,408 B2 | 4/2010 | Schneider et al. | |
| 7,708,595 B2 | 5/2010 | Chow et al. | |
| 7,720,075 B2 | 5/2010 | Costo | |
| 7,738,482 B2 | 6/2010 | Thousand et al. | |
| 7,860,020 B2 | 12/2010 | Taich et al. | |
| 8,520,562 B2 | 3/2011 | Taich et al. | |
| 7,936,778 B2* | 5/2011 | Ungerboeck | H04L 12/403 370/464 |
| 8,112,646 B2 | 2/2012 | Tsai | |
| 8,196,016 B1 | 6/2012 | Langner et al. | |
| 8,201,005 B2 | 6/2012 | Wertheimer et al. | |
| 8,276,013 B2 | 9/2012 | Diab et al. | |
| 8,284,799 B2 | 10/2012 | Diab | |
| 8,320,411 B1* | 11/2012 | Sedarat | H04W 52/365 370/503 |
| 8,442,099 B1 | 5/2013 | Sedarat | |
| 8,665,902 B2 | 3/2014 | Powell | |
| 8,804,582 B1 | 8/2014 | Taich et al. | |
| 8,804,793 B2 | 8/2014 | Wu | |
| 8,804,798 B2 | 8/2014 | Malkin et al. | |
| 8,854,986 B1 | 10/2014 | Langner | |
| 9,001,872 B1 | 4/2015 | Farjadrad | |
| 9,130,695 B1 | 9/2015 | Dalmia | |
| 9,294,355 B2 | 3/2016 | Edwards | |
| 9,893,756 B1 | 2/2018 | Sedarat | |
| 9,912,375 B1* | 3/2018 | Sedarat | H04L 27/2647 |
| 10,069,521 B1 | 9/2018 | Farjadrad | |
| 10,148,508 B1* | 12/2018 | Sedarat | H04L 12/40 |
| 10,200,151 B1* | 2/2019 | Farjadrad | H04B 17/336 |
| 10,771,100 B1* | 9/2020 | Razavi Majomard | H04L 25/03114 |
| 10,855,395 B2* | 12/2020 | Farjadrad | H04L 1/0045 |
| 2002/0006167 A1 | 1/2002 | McFarland | |
| 2002/0119783 A1 | 8/2002 | Bourlas et al. | |
| 2002/0180547 A1 | 12/2002 | Staszewski | |
| 2003/0040298 A1 | 2/2003 | Heatley | |
| 2003/0156603 A1 | 8/2003 | Rakib | |
| 2003/0186591 A1 | 10/2003 | Jensen et al. | |
| 2003/0223505 A1 | 12/2003 | Verbin et al. | |
| 2004/0023631 A1 | 2/2004 | Deutsch et al. | |
| 2004/0114503 A1 | 6/2004 | Schneider et al. | |
| 2004/0184810 A1 | 9/2004 | Spilman et al. | |
| 2004/0239465 A1 | 12/2004 | Chen et al. | |
| 2005/0025266 A1 | 2/2005 | Chan | |
| 2005/0030808 A1 | 2/2005 | Brown et al. | |
| 2005/0053229 A1 | 3/2005 | Tsatanis et al. | |
| 2005/0055467 A1 | 3/2005 | Campana et al. | |
| 2005/0152466 A1 | 7/2005 | Maltsev et al. | |
| 2008/0187028 A1 | 8/2005 | Lida | |
| 2005/0245216 A1 | 11/2005 | Boos | |
| 2005/0259685 A1 | 11/2005 | Chang et al. | |
| 2006/0109784 A1 | 5/2006 | Weller et al. | |
| 2006/0153106 A1 | 7/2006 | Laakso et al. | |
| 2006/0153307 A1 | 7/2006 | Brown et al. | |
| 2006/0159186 A1 | 7/2006 | King | |
| 2006/0215561 A1 | 9/2006 | Wang et al. | |
| 2006/0274824 A1 | 12/2006 | Kroninger | |
| 2007/0076722 A1 | 4/2007 | Ungerboeck et al. | |
| 2007/0081475 A1 | 4/2007 | Telado | |
| 2007/0140289 A1 | 6/2007 | Tellado et al. | |
| 2007/0162818 A1 | 7/2007 | Shen et al. | |
| 2007/0192505 A1 | 8/2007 | Dalmia | |
| 2007/0248024 A1 | 10/2007 | Conway et al. | |
| 2008/0034137 A1 | 2/2008 | Whitby-Strevens | |
| 2008/0089433 A1 | 4/2008 | Cho et al. | |
| 2008/0294919 A1 | 11/2008 | Lida et al. | |
| 2008/0310432 A1 | 12/2008 | Ranjan | |
| 2009/0080459 A1 | 3/2009 | Barkan et al. | |
| 2009/0097389 A1 | 4/2009 | Diab | |
| 2009/0097401 A1 | 4/2009 | Diab | |
| 2009/0097442 A1 | 4/2009 | Diab | |
| 2009/0150745 A1 | 6/2009 | Langner et al. | |
| 2009/0154455 A1 | 6/2009 | Diab | |
| 2009/0187778 A1 | 7/2009 | Diab | |
| 2009/0148161 A1 | 8/2009 | Walker | |
| 2009/0282277 A1 | 11/2009 | Sedarat | |
| 2010/0046543 A1 | 2/2010 | Parnaby | |
| 2010/0054315 A1 | 3/2010 | Huang | |
| 2010/0075704 A1 | 3/2010 | McHenry et al. | |
| 2010/0111202 A1 | 5/2010 | Schley-May et al. | |
| 2010/0115295 A1 | 5/2010 | Diab | |
| 2010/0188980 A1 | 7/2010 | Desai et al. | |
| 2010/0322105 A1 | 12/2010 | Diab | |
| 2011/0051620 A1 | 3/2011 | Taich | |
| 2011/0206042 A1 | 8/2011 | Rarrab | |
| 2011/0249686 A1 | 10/2011 | Langner | |
| 2011/0249687 A1 | 10/2011 | Diab | |
| 2011/0261814 A1 | 10/2011 | Matthews | |
| 2012/0063295 A1 | 3/2012 | Bliss | |
| 2012/0106345 A1 | 5/2012 | Diab | |
| 2012/0170591 A1 | 7/2012 | Diab et al. | |
| 2012/0188894 A1 | 7/2012 | Huschke et al. | |
| 2005/0058152 A1 | 3/2013 | Oksanen et al. | |
| 2013/0070823 A1 | 3/2013 | Malkin et al. | |
| 2014/0258813 A1 | 9/2014 | Lusted | |

OTHER PUBLICATIONS

U.S. Appl. No. 14/961,810, Sedarat.

Ken Christense et al., IEEE 802.3az The Road to Energy Efficient Ethernet, IEEE Communications Magazine, Nov. 2010, 7 Pages.

Hugh Barrass, EEE Exchange of Management Information, IEEE 802.3az EEE Task Force, Mar. 2009, Vancouver, British Columbia, 11 Pages.

Zimmerman et al., IEEE Power Backoff, Solarflare,Teranetics, Feb. 19, 2005, 12 pages.

Zimmerman et al., IEEE Power Backoff, Mar. 15, 2005, 16 pages.

Nariman Yousefi, Multi Rate Phy, IEEE Meeting Slides, Jul. 2003, 14 pages.

Zhang et al.; IEEE Apr. 2010; pp. 843-855; "An Efficient 10GBASE-T Ethernet LDPC Decoder Design with Low Error Floors".

Mankar et al.; ACEEE, Proc of Intl. Conf. on Recent Trends in Information, Telecommunication and Computing, ITC; 5 pages; "Algorithms and Architectures for Reduced Complexity LDPC Decoding".

* cited by examiner

RAPID TRAINING METHOD FOR HIGH-SPEED ETHERNET

TECHNICAL FIELD

The disclosure herein relates to communications systems, and more specifically to high-speed Ethernet systems and methods.

BACKGROUND

Modern high-speed Ethernet protocols, such as 10GBASE-T and NBASE-T, rely on adaptive filters and digital signal processing circuitry to address noise that may affect the Ethernet link. Prior to operation of the link in an "online" mode, the link undergoes autonegotiation and a full training sequence to place the link in an initial state that's capable of overcoming the noise. While operating in the "online" mode, the link may briefly go "offline" due to extraneous alien crosstalk or other noise. Fast retrain sequences may bring the link back online in a very short period of time without the need to carry out a full training sequence.

Conventional training sequences for high-speed Ethernet links generally take approximately two seconds for full training, and approximately 30 milliseconds for a fast retraining. For many applications, such time durations for training functions may be undesirable.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Figure 1:
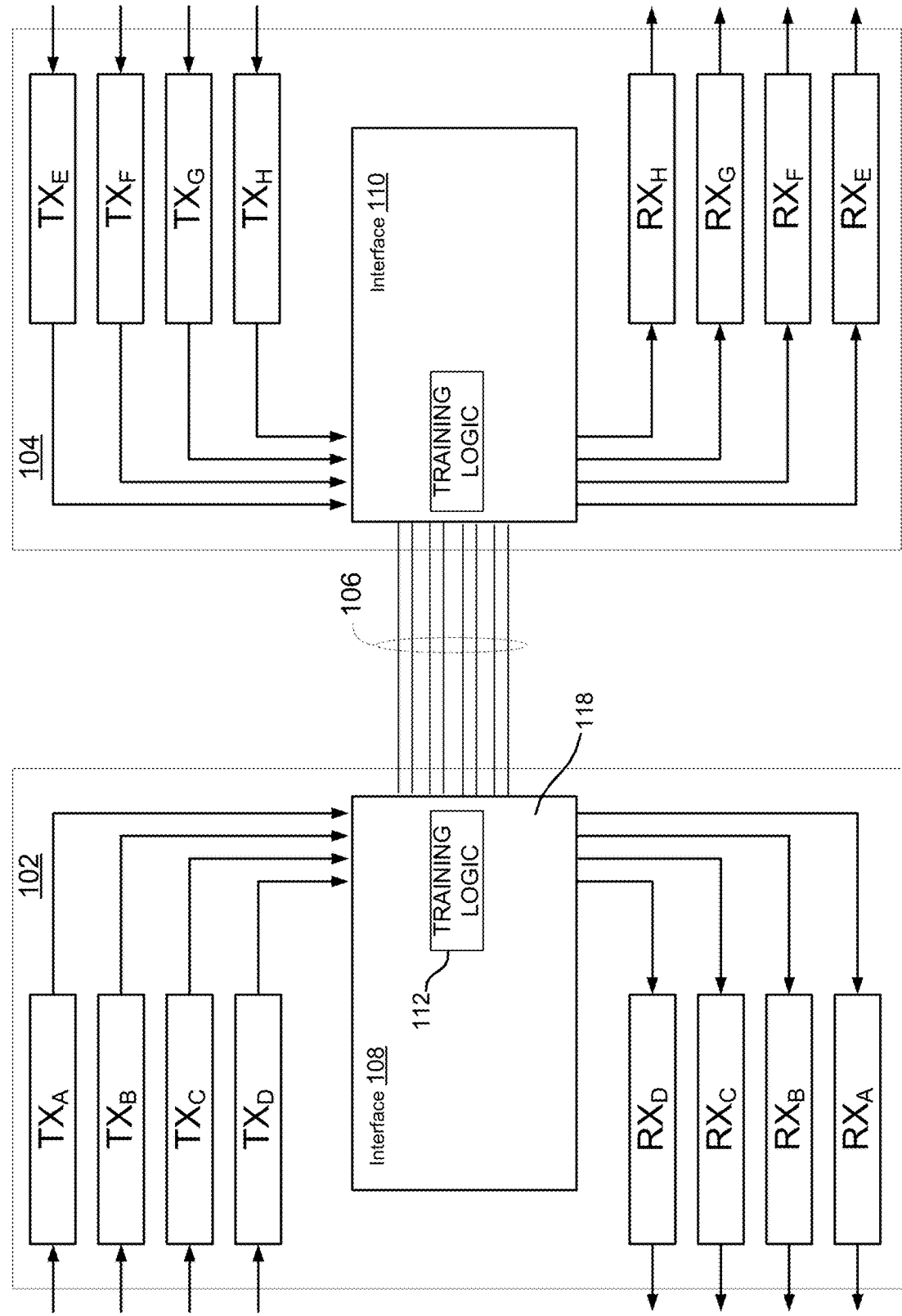
FIG. 1 illustrates a high-level transmitter/receiver (transceiver) channel architecture for an NBASE-T Ethernet transceiver.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters $TX_A$-$TX_D$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as one similar to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners." In accordance with the 10GBASE-T standard, the transmitters cooperate with precoders (not shown), and more specifically Tomlinson-Harashima precoders (THP) that apply THP coefficients to transmit signals to pre-compensate for channel imperfections and expected noise/distortion.

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

For one embodiment, the interface 108 for each chip includes training logic 112 that manages and controls full training sequences and rapid retrain operations, as more fully explained below. The training logic associated with the interface 108 may be shared amongst the channels, or provided as separate resources for each of the transceiver channels.

Figure 2:
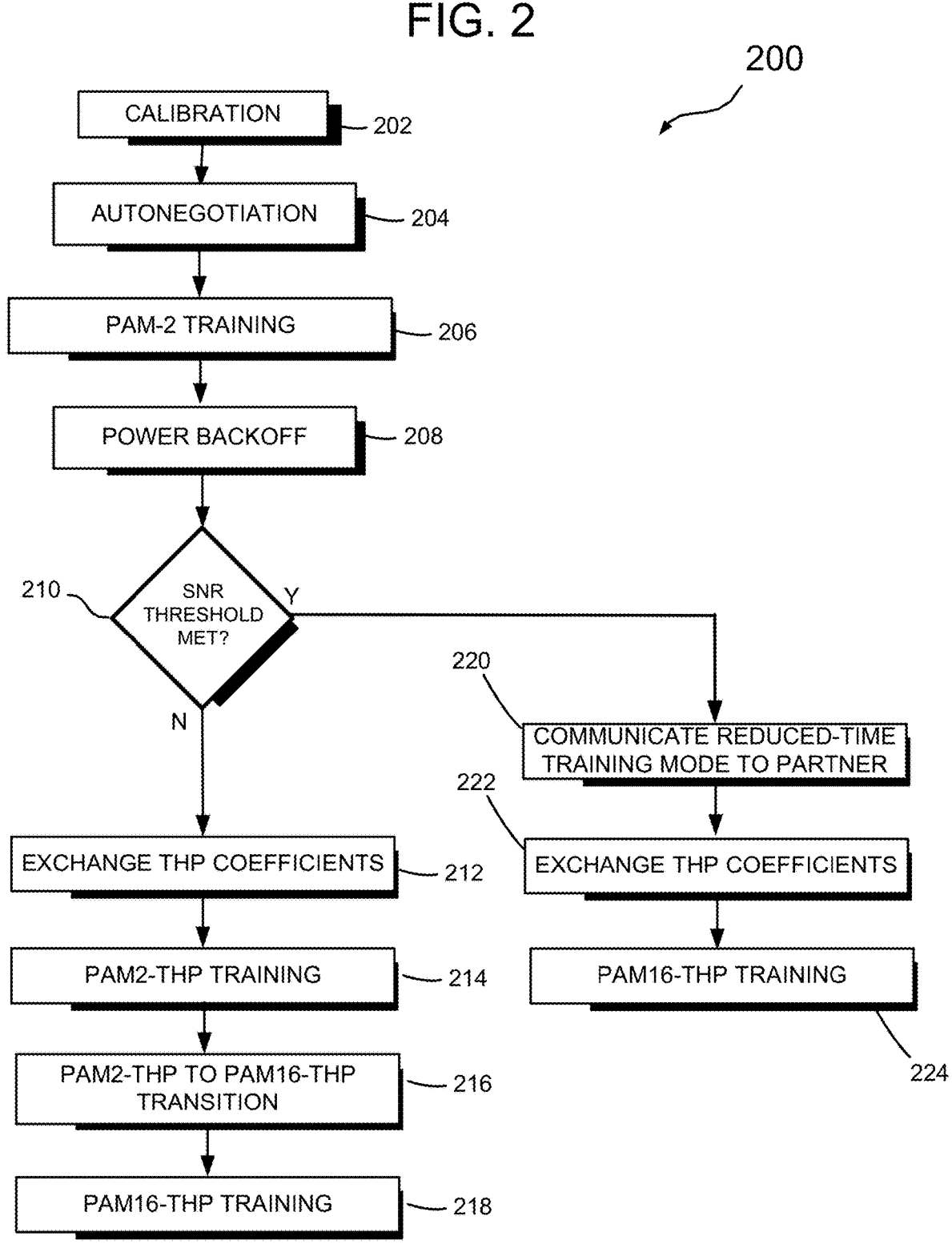
FIG. 2 illustrates a flowchart of steps for one embodiment of a method for performing a full training sequence for initializing a link.

FIG. 2 illustrates steps employed for one embodiment of a full training sequence, generally designated 200, used to train the parameters of each link partner transceiver to achieve fully-functional nominal operation. Nominal operation is a predefined level of operation at which parameters are at a particular target level (such as bit error rate being under a particular target rate), and for which the transceiver can transmit and receive data over the link. The full training sequence is a predefined sequence of stages or steps known by each of the link partners, although the boundaries of each step in the sequence may be overlapped or blurred in some embodiments. The sequence typically occurs at a predefined point of operation, such as at startup when a transceiver is powered on or is first connected to a communication link. During nominal operation, after the full training sequence, the transceiver continues to adapt parameters to changing characteristics of the link based on received data. However, some characteristics change so quickly that the receiver cannot adapt quickly enough, due to noise, interference, or other disturbances, which sometimes cause the loss of the link. In existing standards, the full training sequence is used to re-train transceiver parameters when a transceiver loses a communication link in a manner such that a fast retrain sequence cannot bring up the link. The full training sequence example of FIG. 2 is an example pertinent to the 10GBASE-T and NBASE-T communication standards, but other full training sequences may be used in other embodiments.

Further referring to FIG. 2, the full training sequence 200 may optionally first include a calibration process, at 202. The calibration process is typically not part of a communication standard, but is often employed to allow the transceiver components to operate near optimal condition. For example, the calibration process may include calibration of analog front end (AFE) components of the transceiver such as a digital-to-analog converter (DAC), line driver, low pass filter, gain stage, and analog-to-digital converter (ADC). For some embodiments, the calibration does not occur only in step 202, but may continue to occur during parts or all of the training or retraining sequence. In one embodiment, the calibration cooperates with a determination step, described below, for confirming whether a sequence of precoded training signals may be omitted in an effort to significantly reduce training time.

With continued reference to FIG. 2, the full training sequence 200 includes an autonegotiation step, at 204. The autonegotiation step involves having the link partners communicate across the communication link to establish the common conditions under which normal data communication will operate. For example, the autonegotiation step can include determining which communication standard to use (10GBASE-T, NBASE-T, etc.), and determining which link partner will be the Master and which one will be the Slave (the Slave recovers timing information from the Master needed for communication). Additional information such as support for fast retrains may also be advertised between the link partners.

Following autonegotiation, at step 204, a pulse-amplitude modulation-2 (PAM-2) training signal transmission occurs next, at 206. A PAM-2 signal has only 2 signal levels to transmit (e.g., bits are translated to either of two signal levels, e.g., +1V and −1V), and since the levels are further apart than in a modulation scheme having a greater number of levels, PAM-2 signals are easier to decode and detect in a higher-noise environment. As a result, the signals are more suitable for transmission during training, when the communication may be more prone to noise and error. In contrast, DSQ128 signals are typically used during normal transmission for the 10GBASE-T format, which, similar to PAM-16, allows 16 levels of signal after the receiver parameters have been trained. This allows many more signal levels to be used for a symbol, which may thus represent multiple bits. The PAM-2 signals can be used to determine a transmitter gain and a setting for a power backoff adjustment, described below, among other functions such as adapting filters and equalizers and clock-timing recovery. Furthermore, during the PAM-2 sequence, the receiver gain may be determined so that the receiver gain may be updated and adapted.

Further referring to FIG. 2, and continuing with the "legacy" mode of training steps, the training next involves a power backoff step, at 208. In this step, the power level used for transmission may be reduced down to a minimum level needed for communication, thus saving power during operation while reducing noise such as crosstalk to and from adjacent communication ports of the transceiver.

At this point, many of the steps described above are mandated in various Ethernet standards, such as IEEE 802.3 and IEEE 802.3bz. As a result, future training capabilities should have provisions for legacy training operations that include a "legacy" training mode of operation consistent with the prior standardized steps. The inventor has discovered that certain of the standardized training steps specified in the aforementioned standards may be omitted in circumstances where received signals meet or are expected to meet a certain signal quality threshold. For one embodiment, a determination of the signal quality may be made on the transmitted PAM-2 training signals, at 210. For other embodiments, the "determination" may merely involve an expectation that the link is expected to support a minimum level of signal quality above the threshold. Examples of signal quality parameters or indicators may involve signal-to-noise ratio (SNR) or received signals, or some form of linearity evaluation of signals propagating along the link. If the signals fail to meet a threshold signal quality level, which will often be in rare circumstances, then the standardized sequence of steps continues below consistent with a "legacy" full training mode. Should the PAM-2 training signals meet the signal quality threshold, then a reduced-step full training mode may be entered, described more fully below, to significantly reduce the time to train the link.

Following the signal quality determination, at 210, a further PAM-2 training sequence may be carried out, at 212, which also includes a determination of precoder coefficients for the link partner transmitters. For one embodiment, the precoder coefficients correspond to Tomlinson-Harashima Precoding (THP) coefficients. As part of this step, the determined coefficients for each transmitter may be exchanged between the link partners so that each transceiver has the appropriate precoder coefficients as determined by its link partner, and the receiver is synchronized with the transmitter that is now using the precoding.

Further referring to FIG. 2, following the THP coefficient exchange, the PAM-2 training signal is transmitted with the precoding, at 214, using the appropriate coefficients and other parameters determined above. The precoding applied to the PAM-2 signal allows the far-end receiver to retune its filters for the potential difference between optimal operating points with and without the precoding, so that the same adaptation can be used during normal transmission (since THP is sent by the transmitter, it is not adapted to during normal data reception by the receiver).

Following the PAM-2THP step, at 214, a transition period occurs, at 216, to allow the link to transition from transmitting the precoded PAM-2 signals, to transmitting a multi-PAM type of signal having characteristics more closely resembling those actually used during nominal operation, such as a PAM-16 signal. After the transition period, actual PAM-16 training signals encoded with the THP coefficients, and modulated via a DSQ128 type of modulation may be transmitted, at 218. After sending the PAM-16 training signal for an appropriate time to adapt the filters, equalizers, timing, and other components, the training sequence ends and normal operation begins, in which actual data is transmitted and received over the link as PAM-16 signals.

While the "legacy" training mode described above works well for its intended applications, the time expended to carry out the PAM-2THP steps 214 and 216 may take up to 650 milliseconds or more. With ever-improving signaling media, ADCs and DAC architectures, the signal quality of the initial PAM-2 signals transmitted during the training sequence is often very good. Consequently, incremental training steps such as encoding the PAM-2 signals with the THP coefficients are often "overkill", yet take relatively long times to carry out.

With the above considerations in mind, should the detected PAM-2 signal quality from the signal quality determination at step 210 meet the predetermined quality threshold, one embodiment provides for a reduced-processing training mode, beginning at 220, that omits the legacy PAM-2THP steps, resulting in a reduction in training time by approximately 32%. Note that in some embodiments, a separate "legacy" mode of full training may not be provided as a separate mode from the reduced-processing training mode, especially in circumstances where a certain minimal level of signal quality is expected from the link.

With further reference to FIG. 2, for some embodiments, and after confirming that the signal quality meets a certain threshold, a communication between link partners in the reduced-processing training mode is carried out, at 220. This is carried out so that the partners know that the reduced-processing mode steps will be followed, instead of the legacy mode steps. This communication may be made by, for example, an InfoField protocol that includes one or more bits flagging use of the reduced-processing full training mode.

Following the communication step, at 220, the THP coefficients may be determined, and exchanged, at 222, in a manner similar to the legacy training mode. Following the coefficient exchange, however, instead of carrying out a PAM-2THP training sequence with the associated transition time, the reduced-processing full training mode goes directly to a PAM-16THP step, at 224, to run a training sequence of PAM-16 signals encoded by the THP coefficients determined earlier.

By eliminating the PAM-2THP legacy mode training step and associated transition time, a full training sequence may be reduced by approximately 650 milliseconds, which is almost a third of the typical two seconds often allocated to a full training sequence.

Operation of the link in a normal operation mode, after a full training sequence, often runs very well in transferring data at very high data rates without interruption. In some situations, however, extraneous noise such as crosstalk or interference may prevent the link from transferring data optimally. Where the link parameters remain relatively unchanged, restoring the link to optimal operation may involve a fast retrain, which involves retraining the link with fewer steps than a full retrain, and which is far faster (on the order of 30 milliseconds, instead of two full seconds).

Figure 3:
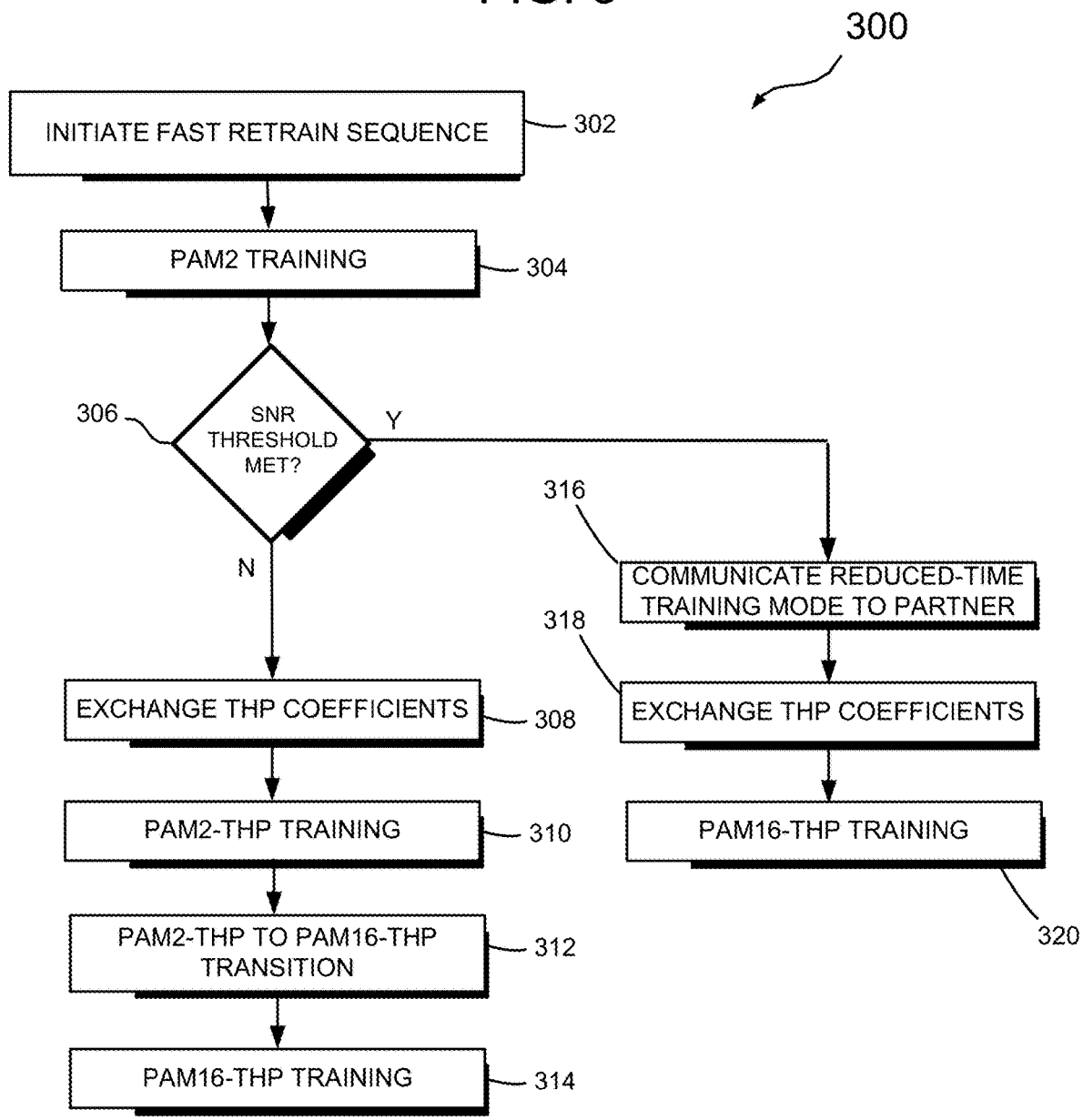
FIG. 3 illustrates a flowchart of steps for one embodiment of a method for performing a fast retrain sequence for a link.

Referring now to FIG. 3, one embodiment of a fast retrain method, generally designated 300, provides multiple fast retrain modes of operation in an Ethernet transceiver that can enable a fast link recovery for a link affected by a change in noise or some other undesirable distortion characteristic. In response to detecting a drop in link quality, such as a minimum SNR or rate of LDPC error frames or other LDPC statistics, a fast retrain sequence may be initiated, at 302. As noted above, a fast retrain is a brief link training sequence that resets a minimal number of link parameters to allow for changes in link parameters without necessarily requiring the link to go offline for a full auto-negotiation and training cycle, which may take a few seconds.

Further referring to FIG. 3, in one embodiment, the fast retrain sequence first provides a PAM-2 transmission sequence, at 304. The PAM-2 training sequence allows updating of transceiver parameters. THP precoding coefficients as well as receiver equalizers and other filters can also be re-optimized due to the new noisy environment. Similar to the full training modes described above, one embodiment provides a legacy fast retraining mode that follows standardized fast retraining sequences where the detected signal quality is under a certain threshold, determined at 306. A second fast retrain mode involves reducing steps even further, where the signal quality of the link remains above a certain threshold.

With continued reference to FIG. 3, where the signal quality is below the determined threshold, the newly updated THP coefficients are exchanged between link partners and the receiver synchronized with precoded transmission data from the far-end link partner transmitter, at 308. In other embodiments, other signal types, modulations, or formats can be used for training signals as appropriate.

Further referring to FIG. 3, following the THP coefficient exchange, the PAM-2 training signal is transmitted with the precoding, at 310, using the appropriate coefficients and other parameters determined above. The precoding applied to the PAM-2 signal allows the far-end receiver to retune its filters for the potential difference between optimal operating points with and without the precoding, so that the same adaptation can be used during normal transmission.

Following the PAM-2THP step, a transition period occurs, at 312, to allow the link to transition from transmitting the precoded PAM-2 signals, to transmitting a multi-PAM type of signal having characteristics more closely resembling those actually used during nominal operation, such as a PAM-16 signal. After the transition period, actual PAM-16 training signals encoded with the THP coefficients, and modulated via a DSQ128 type of modulation may be transmitted, at 314. After sending the PAM-16 training signal for an appropriate time to adapt the filters, equalizers, timing, and other components, the training sequence ends and normal operation begins, in which actual data is transmitted and received over the link as PAM-16 signals.

While the "legacy" fast retrain mode described above works well for its intended applications, the time expended to carry out the PAM-2THP steps 310 and 312 may take up to 10 milliseconds or more. This is approximately one-third of the timing budget allotted to each fast retrain sequence.

With the above in mind, should the detected PAM-2 signal quality from the signal quality determination at step 306 meet the predetermined quality threshold, one embodiment provides for a reduced-processing fast retrain mode, beginning at 316, that omits the legacy PAM-2THP steps. This results in a training time reduction by approximately one-third. Note that in some embodiments, a separate "legacy" mode of fast retraining may not be provided as a separate mode from the reduced-processing training mode.

With further reference to FIG. 3, for some embodiments, and after confirming that the signal quality meets a certain threshold, a communication between link partners in the reduced-processing training mode is carried out, at 316. This is carried out similar to the full training sequence, so that the partners know that the reduced-processing fast retrain mode will be followed, instead of the legacy mode. This communication may be made by, for example, an InfoField protocol that includes one or more bits flagging use of the reduced-processing training mode.

Following the communication step, at 316, the THP coefficients may be determined, and exchanged, at 318, in a manner similar to the legacy training mode. Following the coefficient exchange, however, instead of carrying out a PAM-2THP training sequence and associated transition time, the reduced-processing mode goes straight to a PAM-16THP step, at 320, to run a training sequence of PAM-16 signals encoded by the THP coefficients determined earlier.

By eliminating the PAM-2THP training step and associated transition time, a full training sequence may be shortened by approximately 10 milliseconds, which is almost a third of the typical 30 milliseconds often allocated to a legacy fast retrain sequence. Since fast retrains may occur often during normal operation of the link, repetitive fast retrain sequences of shorter duration saves significant time.

Those skilled in the art will appreciate the benefits and advantages provided by the embodiments described herein. Reducing full training and fast retraining steps for high speed Ethernet transceivers minimizes link downtime while improving processing efficiency.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operation for an Ethernet transceiver, the method comprising:
   entering a training sequence of steps, the training sequence of steps including
      transferring uncoded two-level symbols to a link partner, each uncoded two-level symbol exhibiting one of two signal levels;
      exchanging precoder coefficients with the link partner; and
      directly following exchanging precoder coefficients, and without effecting an intervening transfer of two-level symbols, transferring multi-level symbols to the link partner, the multi-level symbols i) being encoded in a manner that is consistent with the exchanged precoder coefficients and ii) having a number of signal levels providing a higher level of encoding than two-level symbols.

2. The method according to claim 1, wherein the precoder coefficients comprise:
   Tomlinson-Harashima Precoder (THP) coefficients.

3. The method according to claim 1, further comprising:
   informing the link partner to not effect an intervening transfer of two-level symbols and to proceed directly to transferring the multi-level symbols following the exchanging precoder coefficients.

4. The method according to claim 3, wherein the informing is carried out via at least one InfoField training frame.

5. The method according to claim 1, wherein:
   the two-level symbols comprise PAM-2 symbols; and
   the multi-level symbols comprise PAM-16 symbols.

6. The method according to claim 1, wherein:
   the training sequence of steps comprises a full training sequence of steps.

7. The method according to claim 1, wherein:
   the training sequence of steps comprises a fast retrain sequence of steps.

8. An integrated circuit (IC) Ethernet transceiver chip comprising:
   precoder circuitry including multiple precoder taps that operate based on operating precoder coefficients; and
   training logic to control a training sequence the training logic to transfer one or more uncoded two-level symbols to a link partner, each uncoded two-level symbol exhibiting one of two signal levels;

exchange updated precoder coefficients with the link partner, the updated precoder coefficients to serve as the operating precoder coefficients; and directly following the exchange of the updated precoder coefficients, without performing an intervening transfer of two-level symbols, transfer one or more multi-level symbols to the link partner, the multi-level symbols i) being encoded in a manner that is consistent with the exchanged updated precoder coefficients and ii) having a number of signal levels providing a higher level of encoding than two-level symbols.

9. The IC Ethernet transceiver chip according to claim 8, wherein:

the precoder circuitry comprises a Tomlinson-Harashima Precoder (THP); and the precoder coefficients comprise THP coefficients.

10. The IC Ethernet transceiver chip according to claim 8, wherein:

the two-level symbols comprise PAM-2 symbols; and the multi-level symbols comprise PAM-16 symbols.

11. The IC Ethernet transceiver chip according to claim 8, wherein:

the training sequence comprises a full training sequence that is carried out during a training mode of operation.

12. The IC Ethernet transceiver chip according to claim 8, wherein:

the training sequence comprises a fast retrain sequence that is carried out during a data transfer mode of operation.

13. A method of operation for an Ethernet transceiver, the method comprising:

for a first mode of operation, performing a first training sequence by transferring a first sequence of uncoded two-level symbols to a link partner, each of the uncoded two-level symbols exhibiting one of two signal levels;

exchanging first precoder coefficients with the link partner, and directly following exchanging the first precoder coefficients, and without an intervening transfer of two-level symbols, transferring multi-level symbols to the link partner, the multi-level symbols encoded consistent with the exchanged first precoder coefficients and having greater than two symbol levels; and for a second mode of operation, performing a second training sequence by transferring a second sequence of uncoded two-level symbols to the link partner;

exchanging second precoder coefficients with the link partner, transferring coded two-level symbols to the link partner, the coding consistent with the second precoder coefficients, and transferring second multi-level symbols to the link partner, the second multi-level symbols i) being encoded consistent with the exchanged second precoder coefficients and ii) having a number of signal levels providing a higher level of encoding than two-level symbols.

14. The method according to claim 13, wherein a selection between using the first mode of operation or the second mode of operation is based on a signal quality parameter.

15. The method according to claim 13, wherein the first precoder coefficients and the second precoder coefficients comprise:

Tomlinson-Harashima Precoder (THP) coefficients.

16. The method according to claim 13, wherein the first mode of operation further comprises:

informing the link partner to not effect an intervening transfer of two-level symbols and to proceed directly to transferring the multi-level symbols following exchanging precoder coefficients.

17. The method according to claim 16, wherein the informing is carried out via at least one InfoField training frame.

18. The method according to claim 13, wherein:

the two-level symbols comprise PAM-2 symbols; and the multi-level symbols comprise PAM-16 symbols.

19. The method according to claim 13, wherein:

the first training sequence and the second training sequence comprise full training sequences that are carried out during a training mode of operation.

20. The method according to claim 13, wherein:

the first training sequence and the second training sequence comprise fast retrain sequences that are carried out during a data transfer mode of operation.

* * * * *